United States Patent Office 3,308,110
Patented Mar. 7, 1967

3,308,110
PROCESS FOR POLYMERIZING CONJUGATED DIENES USING A CATALYST COMPRISING A NON-POLYMERIZING DIENE AND LITHIUM OR A HYDROCARBON LITHIUM
Ervin G. Pritchett, Cincinnati, Ohio, assignor to National Distillers and Chemical Corporation, New York, N.Y., a corporation of Virginia
No Drawing. Filed July 12, 1963, Ser. No. 294,762
22 Claims. (Cl. 260—94.2)

The invention relates to an improved process for polymerizing active conjugated dienes. More particularly, the invention relates to an improved process for producing conjugated dienes polymers having low vinyl unsaturation, utilizing as a catalyst system a combination of a non-polymerizing diene, i.e., not polymerized by lithium metal or organolithium compounds, and lithium metal or an organolithium metal compound.

It is known that active conjugated dienes can be polymerized to polymers having low vinyl unsaturation using as a catalyst an organolithium compound or lithium metal that yields organolithium intermediates. Such polymerization, however, is unsatisfactory because the rate is undesirably slow below about 60° C. While polymerization rates increase with increasing temperature, at temperatures above about 60° C. the organolithium compound or intermediate undergoes decomposition. This is a disadvantage when high molecular weight linear products with narrow molecular weight distributions are sought or when the product polymers are to be terminated by functional groups via displacement of the terminal lithium.

It is known in the art that the presence of ether in the reaction medium increases the rate of polymerization of conjugated dienes; however, as a consequence of the presence of even small amounts of ether, there is a substantial loss of polymer linearity. Attempts to increase diene polymerization rates without loss of polymer linearity by modifying the organolithium catalyst, for example by addition of a hindered tertiary amine, also have serious disadvantages, among these being an induced loss of active terminal organolithium from the growing polymer chains.

It is an object of this invention to polymerize active conjugated dienes to polymers having low vinyl unsaturation by a process that overcomes the disadvantages of the processes of the prior art.

It is a further object of this invention to increase the rate of polymerizing active conjugated dienes.

A still further object of this invention is to polymerize rapidly conjugated dienes to terminally functionalized polymers having increased retention of active terminal groups.

It is also an object of this invention to provide substantial increases in the polymerization rates of conjugated dienes while concurrently decreasing the amount of vinyl unsaturation in the finished polymer.

Additional objects will become apparent from the following detailed description.

It has now been found that active conjugated dienes can be rapidly polymerized to low vinyl (high 1,4-addition) polymers while maintaining complete activity of the anionic terminal lithium to subsequent reaction by using as catalyst a combination of non-polymerizable diene and lithium metal or an organolithium compound.

By applying the process of this invention, the polymerization rate is increased significantly without the usual concomitant side effects of increased molecular weight, wider molecular weight distribution, and loss of reactive lithium chain ends. This improved process is particularly useful for the production of linear or stereoregular rubbers or for the production of highly linear functionalized polymers such as hydroxyl-terminated linear dienes.

The combination of (1) diene that is non-polymerizable via lithium or organolithium catalysts and (2) lithium metal or an organolithium compound is an exceptionally effective catalyst for the polymerization of anionically polymerizable conjugated dienes, said polymerization taking place essentially by 1,4-addition and resulting in liquids or rubbery solids having low vinyl content. The non-polymerizable diene portion (1) of the catalyst does not react with the lithium metal or organolithium compound portion (2) nor does it copolymerize with the polymerizable dienes, thus making it possible and convenient to recover the non-polymerizable diene from the polymerization mixture.

In carrying out the process of this invention the polymerizable conjugated diene, e.g., butadiene or isoprene, is contacted with the combination catalyst at normal temperatures and pressures by any convenient method. Preferably a mixture of the non-polymerizing diene and the lithium or organolithium compound is injected as a precombined catalyst combination into a process stream consisting of the polymerizable diene monomer in an inert liquid diluent at normal or slightly elevated temperature and under sufficient pressure to retain the monomer in solution. The temperature and pressure are maintained until the desired degree of polymerization is achieved; the reaction is then terminated. It is also possible to adapt this procedure to a batch or semi-batch operation.

Other possible modes of contacting the monomer with the catalyst include (1) injecting the organolithium compound into a mixture of the polymerizable and non-polymerizing dienes and (2) adding the polymerizable diene to a solution of the combination catalyst in an inert diluent.

The present process is preferably, although not necessarily, carried out in the presence of an inert liquid reaction medium. Examples include aliphatic and aromatic hydrocarbons, such as pentane, hexane, heptane, heptene-1, isooctane, cyclohexene, cyclohexane, benzene, toluene, xylene, etc.; alkylate; and the like; and mixtures thereof. The amount of diluent may range up to about 20 parts by weight per part of polymer; preferably the range is between about 1 to 6 parts.

It is necessary in carrying out the present process that all of the materials used be free of substances that can destroy the organolithium compound, e.g., water; carbon dioxide; oxygen; compounds containing active hydrogen, such as alcohols, esters, amines containing —N—H groups; and the like; that tend to decrease polymer linearity, e.g., ethers; or that tend to destroy polymer functionality, e.g., tertiary amines. The reaction is carried out preferably in an atmosphere of nitrogen or other inert gas, such as argon or helium.

The present process is particularly applicable to the polymerization of butadiene and of isoprene, but it applies equally to other active conjugated dienes, such as pentadiene-1,3; 2,3-diphenylbutadiene-1,3; 2,3-dimethyl-1,3-butadiene; 2-chloro-1,3-butadiene; 2,3-dichloro-1,3-butadiene; 2,4-hexadiene; chloro-fluoro-1,3-butadiene; and mixtures of these dienes with each other or with other monomers copolymerizable therewith, as for example aliphatic diolefins, styrene, substituted styrenes, methacrylate esters, e.g., methyl methacrylate, or divinylbenzene.

The non-polymerizing diene portion of the catalyst is a hydrocarbon diene of the empirical formula $C_nH_{2n-2}$ or $C_nH_{2n-4}$ wherein $n$ is an integer ranging from 5 to about 30 and which has one of the following carbon chain structures.

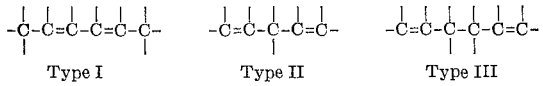

Type I        Type II        Type III

Preferred is a 2,5-dialkylhexadiene-2,4 (Type I), especially 2,5-dimethylhexadiene-2,4. Other dienes not readily polymerized by organolithium compounds, however, also can be used, such as 2,5-dimethylhexadiene-1,5 (Type III), 1,4-dimethylenecyclohexane (Type III, cyclic), cyclohexadiene-1,3 (Type I, cyclic), 1,4-pentadiene (Type II), and the like, or mixtures thereof. These dienes may be purified satisfactorily for the purposes of this process by contact with a molecular sieve or by distillation from an organolithium compound.

The organolithium portion of the catalyst can be any alkyl, alkaryl, or cycloalkyl lithium, such as for example butyl lithium, propyl lithium, isobutyl lithium, amyl lithium, cyclohexyl lithium, phenyl ethyl lithium, dilithiopentane, dilithionaphthalene, and the like, or mixtures thereof. Alternatively, lithium metal may replace the organolithium portion of the catalyst, but a preformed organolithium compound is preferred to insure a smooth initiation of reaction. (See, for example, H. E. Diem et al., Rubber Chem. and Tech. 34, 197 (1961), where both lithium and organolithium are shown to yield equivalent alkenyl lithium propagating catalysts after reaction with one monomer unit.)

With regard to the proportions of the components of the catalyst, the ratio of the non-polymerizing diene to the lithium or organolithium compound can vary from about 0.1 to over 10 moles per equivalent, the use of the non-polymerizing diene as solvent not being excluded. The use of about 1 to about 6 moles of the non-polymerizing diene per equivalent of lithium or organolithium compound in a non-active solvent is preferred in order to obtain well-controlled polymerizations.

The concentration of total catalyst can range from about 0.001 up to about 10 mole percent, based on the weight of the polymerizable diene. High molecular weight rubbers are produced at the lower catalyst concentrations, whereas useful oils or functionalized fluid polymers are produced at higher catalyst levels. A range of from about 0.01 to about 5 mole percent is preferred.

The polymerization temperature in general can range from about −20° up to about 100° C., but a temperature between about 25° and about 60° C. is preferred. The preferred pressure range is between about 1 and about 2 atmospheres, although it is possible to employ a pressure between less than 1 and up to about 9 atmospheres.

The polymers prepared by the process of this invention are valuable as raw materials for plastics, rubbers, foams, coatings, and the like. The polymeric compounds of this invention can be converted into a wide variety of compounds. Particularly valuable are the carboxyl and hydroxyl compounds which are obtained when the polymers are reacted with a suitable compound, such as an epoxide, for example, an aliphatic epoxide such as ethylene oxide, propylene oxide, or the butylene oxide or an aromatic epoxide such as styrene oxide. The reactant may also be a suitable carbonyl-type compound, such as for example aldehydes, such as formaldehyde, paraformaldehyde, acetaldehyde, propionaldehyde, butyraldehyde, isobutyraldehyde, and the octylaldehydes, e.g., 2-ethylhexaldehyde. Aromatic and heterocyclic aldehydes such as benzaldehyde and furfural can also be used, as can such aldehydes as salicyaldehyde, anisaldehyde, cinnamaldehyde, piperonal, vanillin, acrolein, and crotonaldehyde. Carbonyl compounds of the ketone class also can be employed, for example, acetone, methyl ethyl ketone, diethyl ketone, acetophenone, benzophenone, methyl vinyl ketone, mesityl oxide, phorone, and benzoquinone. It is also possible to produce "monools" from the polymers of this invention by oxidizing them with oxygen itself, either as pure oxygen or admixed with inert materials, such as in dry air. Ozone also can be used as well as oxidizing materials that yield oxygen or its oxidizing equivalents. These include sodium peroxide, hydrogen peroxide, the persulfates, and other organic and inorganic peroxides, metal peroxides, nitrogen oxides, nitro-aromatic compounds such as nitrobenzene, and some metal salts.

At least one equivalent of the hydroxyl-forming reactant is required for each molecule of the polymer, and in order to insure complete reaction an excess of the reactant is usually employed. When using an epoxide, for example, the excess may be up to about 500 percent; it is preferably from about 10 percent up to about 150 percent.

The reaction with the hydroxy-forming compound, for example as in the case of using an epoxide, is followed by treating the lithium salts of the resulting corresponding hydroxyl compounds with a hydrolyzing agent, e.g., water, an alcohol such as methanol or ethanol, etc., to destroy any unreacted lithium and to liberate the hydroxyl compounds from their lithium derivatives that are initially formed. The hydroxyl compounds are isolated from this reaction mixture by extraction, distillation, or other suitable means.

The reaction of the polymer with the appropriate hydroxyl- or carboxy-forming compound is generally carried out at a temperature between about the reflux temperature of the selected reaction medium and about −60° C. or lower; the temperature is preferably between about the reflux temperature and about −40° C.

Here to it is important that the presence of moisture and compounds containing active hydrogen be carefully controlled in order to prevent premature loss of terminal lithium groups. It is also necessary that other reactive materials be excluded; therefore, the reaction should be conducted in an inert atmosphere such as nitrogen, argon, helium, or the like.

Other than being treated to produce a polymeric monool as aforedescribed, the polymers prepared by the present process can be reacted with other compounds to give a wide range of products. For example, they can be reacted with a Grignard-type reactant having carbonyl, thionyl, and nitrile groups. Typical examples of such reactants are sulfur dioxide, benzene sulfonyl chloride, thionyl chloride, acetonitrile, propionitrile, and the like. In addition, reactions with halides, dihalides, trihalides, and tetrahalides, particularly chlorides, bromides, and iodides, are suitable, as are reactions with organic compounds such as alkylaryl, acetylenic, nitrile, and cyclodienyl compounds and reactions with combinations of the above reactants.

Although the present invention is being illustrated with the formation of monofunctional and non-functional polydienes, it also is applicable to linear difunctional polydienes.

The following examples illustrate methods of carrying out the present invention, but it is to be understood that these examples are given only for the purposes of illustration, not of limitation. All parts are by weight unless otherwise indicated.

*Example I*

A 500-ml. glass flask equipped with a heater, external heating bath, thermometer, Dry Ice-cooled condenser, high speed stirrer, and inlets for solvents, catalyst, monomer, additives, and argon gas was used as the reaction vessel. The vessel was thoroughly dried, evacuated, and filled with argon prior to use, a slight pressure of argon being maintained through subsequent operations. Sodium benzophenone-dried n-heptane (140 parts) was placed in the reactor, and the temperature was brought to 50° C. 0.99 part of n-butyl lithium as a 3.08 N solution in heptane was added all at once; 29.8 parts of butadiene-1,3 (purified over Linde Molecular Sieves No. 5A) was then added at such a rate that active reflux from the condenser was maintained at a reactor temperature of 50° C. The time required for the butadiene addition was 1.1 hours (timed to the end of refluxing after the last portion of butadiene had been added). An additional hour of reaction was allowed in order to insure complete consumption of the butadiene monomer.

The resulting solution was cooled to 5° C.; about 2 parts of ethylene oxide was added rapidly; and stirring was maintained for 0.5 hour. The solution was then poured over Dry Ice and allowed to warm to ambient temperature.

The clear heptane solution was acidified to pH 1 with aqueous oxalic acid, washed with water to pH 5–7, and dried. Removal of the solvent by distillation to 100° C./0.5 mm. left 29.6 parts (94.5 percent yield) of a liquid having a viscosity of 8.0 poise/25° C., an acid number of 0.0, and a hydroxyl number of 25.75. The molecular weight by end group analysis was 2180; calculated on the basis of reagents, the molecular weight was 2040. The product, polybutadienol, had 0.935 hydroxyl group per mole average, that is, 93.5 percent of the anionic ends was maintained.

Infrared analysis of the polybutadienol revealed the following unsaturation: 19.5 percent vinyl, 15.0 percent cis internal, and 65.5 percent trans internal. The butadiene thus had polymerized to a product having a ratio of vinyl to internal unsaturation of 0.242.

*Example II*

The procedure of Example I was repeated using 0.89 part of butyl lithium and 30.1 parts of butadiene-1,3 except that 1.8 parts of 2,5-dimethylhexadiene-2,4 was added after the addition of the butyl lithium and before the addition of the butadiene. At 50° C. the reaction became exothermic, and external cooling was required to maintain the temperature. The butadiene was consumed at such a rate that it had all been added and reflux had ceased within 0.5 hour. The product was 30.1 grams (95.5 percent yield) of polybutadienol having a viscosity of 8.7 poise/25° C., an acid number of 1.37, and a hydroxyl number of 20.98. By end group analysis the molecular weight was 2370; on the basis of butyl lithium and butadiene-1,3 it was 2275. The product had 0.96 hydroxyl group per mole average, that is, 96 percent of the anionic ends was maintained.

Infrared analysis showed that the polybutadienol had 17.5 percent vinyl unsaturation, 14.9 percent cis internal unsaturation, and 67.6 percent trans internal unsaturation. The butadiene thus had polymerized to a product having a ratio of vinyl to internal unsaturation of 0.212. No methyl side groups, which would have been expected if the dimethylhexadiene had copolymerized, were observed, nor did NMR analysis reveal any groupings other than those observed in the product of Example I.

The data of Examples I and II are summarized below.

TABLE 1

| Example | Diene Additive | Time to 100% Conversion, hours | Ratio of Vinyl to Internal Unsaturation | Termination Efficiency, percent |
|---|---|---|---|---|
| I | None | 1.1 | 0.242 | 93.5 |
| II | 2,5-dimethylhexadiene-2,4.[1] | 0.5 | 0.212 | 96.0 |

[1] 1.2 moles per mole of butyl lithium.

*Example III*

70 parts of dry n-heptane and 46 parts of butadiene-1,3 were placed in a dried and argon-filled 8-ounce screw-cap bottle at about −25° C. The bottle was sealed with a neoprene disk under the screw cap which was punctured to allow insertion of a hypodermic needle through the disk. While the contents remained chilled, 0.2 part of n-butyl lithium as a 1.55 N solution in heptane was injected into the bottle which was then shaken well and placed into a 25±1° C. bath. After 2 hours at 25° C., the bottle was chilled to −25° C., and 2 ml. of methanol was injected to destroy the catalyst and short-stop the polymerization. Volatile materials were then distilled off at 90–100° C./0.5 mm. in a nitrogen-swept vacuum oven. The residue, 6.8 parts, represented a 14.8 percent conversion of butadiene-1,3 to polymer.

*Example IV*

The procedure of Example III was repeated using 48 parts of butadiene-1,3 except that 0.38 part of 2,5-dimethylhexadiene-2,4 cocatalyst was added with the heptane solvent. The polymer residue was 12.4 parts, representing a conversion of 25.8 percent.

*Example V*

The procedure of Example III was repeated using 45 parts of butadiene-1,3 except that 1.14 parts of 2,5-dimethylhexadiene-2,4 cocatalyst was added with the heptane solvent. The polymer residue was 15.0 parts, representing a conversion of 33.3 percent.

*Example VI*

The procedure of Example III was repeated using 44.5 parts of butadiene-1,3 except that 0.38 part of 2,5-dimethylhexadiene-1,5 cocatalyst was added with the heptane solvent. The polymer residue was 9.1 parts, representing a conversion of 20.4 percent.

The data of Examples III, IV, V, and VI are summarized in Table 2.

TABLE 2

| Example | Diene Additive | Mole of Diene Cocatalyst per Mole of Butyl Lithium | Monomer Conversion, Percent |
|---|---|---|---|
| III | None | | 14.8 |
| IV | 2,5-dimethylhexadiene-2,4 | 1.12 | 25.8 |
| V | ....do.... | 3.36 | 33.3 |
| VI | 2,2-dimethylhexadiene-1,5 | 1.12 | 20.4 |

*Example VII*

A number of runs were made to show the effect of various additives on the conversion of butadiene to polybutadiene; 3.0 moles of additive per mole of butyl lithium were used, and the procedure of Example III was followed except that the reaction temperature was 30° C. The results are tabulated below.

TABLE 3

| Run No. | Additive | Monomer Conversion, percent at 2 hours reaction time | Relative Change, percent |
|---|---|---|---|
| 1 | None | [1] 33.7±1.2 | 0±1.2 |
| 2 | Allo-ocimene | 32.4 | −1.3 |
| 3 | Nor-bornadiene | 34.8 | +1.1 |
| 4 | 4-methylpentene-2 | 33.4 | −0.3 |
| 5 | 2-methylbutene-2 | 33.0 | −0.1 |
| 6 | Benezene | 31.6 | −2.1 |
| 7 | Durene | 34.8 | +1.1 |
| 8 | Naphthalene | 30.6 | −3.1 |
| 9 | Cyclohexadiene-1,3 | 35.1 | +1.4 |
| 10 | Biallyl(hexadiene-1,5) | 35.1 | +1.4 |
| 11 | N-N-diethylaniline | 38.8 | +5.1 |
| 12 | 2,5-dimethylhexadiene-1,5 | 43.1 | +9.4 |
| 13 | 2,5-dimethylhexadiene-2,4 | 47.5 | +13.8 |

[1] Average of four.
Those additives causing a relative change in percent monomer conversion of more than +1.2 percent (Runs 9 through 13) illustrate positive cocatalytic effects.

As can be seen from the foregoing description and examples, this invention provides an improved process for polymerizing active conjugated dienes to highly linear polymeric rubbers and intermediates. These products are obtained at significantly increased polymerization rates even at reduced temperature, monomer concentration, and monomer purity without significant alteration of molecular structure or loss in functionality.

*Example VIII*

For the purposes of this experiment no exceptional care, such as distillation from sodium, was taken in purifying the monomer. Phillips polymerization-grade isoprene was passed downward through a ½ x 16 in. water-jacketed column packed with 4 inches of 6–16 mesh silica gel at the top and, below this, 12 inches of Linde 1/16 in. No. 4A Molecular Sieve. This operation, to remove added inhibitor and to insure dryness, was carried out under dry nitrogen. Monomer was collected in a small flask from which it was transferred by syringe.

70 parts of dry heptane and 13.6 parts of isoprene were placed in a reactor bottle like that of Example III. At the same time, an equivalent mixture was placed in a second reactor bottle to which 0.31 part of 2,5-dimethylhexadiene-2,4 cocatalyst (distilled from butyl lithium) was added in addition to the heptane and isoprene. 0.0318 part of ethyl lithium as a 1.48 N solution in heptane was added to each bottle, the contents were agitated, and the bottles were placed in a 20.5° C. bath. Samples withdrawn at intervals were evaporated after the addition of 1 drop of alcohol per 10 ml., and the polymer formed was weighed to determine monomer conversion versus time values.

TABLE 4

| Hours Reacted | Ethyl Lithium Only | | Ethyl Lithium + Cocatalyst | |
|---|---|---|---|---|
| | G. Polymer/10 ml. | Percent Conversion | G. Polymer/10 ml. | Percent Conversion |
| 2 | 0.0238 | 2.1 | 0.3658 | 32.4 |
| 3 | 0.0515 | 4.55 | 0.5674 | 50.2 |
| 4 | 0.0936 | 8.3 | 0.7260 | 64.4 |
| 5 | 0.1558 | 13.8 | 0.8265 | 73.1 |

Thus it can be seen that by using only moderately pure isoprene, a 15-fold increase in polymerization rate over a two-hour period was achieved.

Polymerization of the isoprene remaining in the bottles was allowed to proceed to completion, the polymers were precipitated by pouring the solutions into excess methanol, the solvents were decanted, and the polymer products were dried at 60° C./0.5 mm under nitrogen. NMR analysis by the method of Hung Yu Chen, Anal. Chem. 34, 1793 (1962) determined the internal structure of the polymers.

TABLE 5

| Structure | Ethyl Lithium Catalyst Only, percent | Ethyl Lithium + Cocatalyst, percent |
|---|---|---|
| 1, 2 | 5 | 8 |
| 3, 4 | 15 | 8 |
| Cis-1, 4 | 71 | 67 |
| Trans-1, 4 | 9 | 17 |
| Total 1, 4 | 80 | 84 |

That these structures were obtained without exceptional monomer purification and that the higher 1,4 content was obtained at exceptional conversion rates in the presence of 2,5-dimethylhexadiene-2,4 additive are notable features of this example.

*Example IX*

This example illustrates both the high activity obtainable with non-polymerizing diene cocatalysts and the precautions necessary in their use.

76.8 parts of 2,5-dimethylhexadiene-2,4 and 45.4 parts of butadiene-1,3 were placed in a dry, argon-filled 8-ounce screw-cap bottle at about −15° C. The bottle was sealed with a neoprene disk under the screw cap. While the contents were chilled, 0.2 part of butyl lithium as a 1.55 N solution in heptane was injected into the bottle which was then submerged and agitated in a 30° C. water bath behind a safety screen. After about 5 minutes the bottle exploded, depositing a solvent-wet polymer mass into the bath and onto nearby surfaces, indicating that polymerization had occurred with extreme rapidity. At high cocatalyst concentrations it is, therefore, preferred to add monomer to the catalyst-cocatalyst combination.

The foregoing data show clearly that an increase in reaction rate, an improved retention of lithium end groups, and a decrease in undesired vinyl unsaturation in the product result from use of the process of this invention.

While there are above disclosed but a limited number of embodiments of the invention herein presented, it is possible to produce still other embodiments without departing from the inventive concept herein disclosed. It is desired, therefore, that only such limitations be imposed on the appended claims as are stated therein.

What is claimed is:

1. A polymerization catalyst comprising (1) a non-polymerizing diene wherein the double bonds are separated by at least one carbon single bond and (2) a member of the group consisting of lithium metal and a hydrocarbon lithium compound.

2. A polymerization catalyst comprising (1) a non-polymerizing diene wherein the double bonds are separated by at least one carbon single bond, said diene having an empirical formula selected from the group consisting of $C_nH_{2n-2}$ and $C_nH_{2n-4}$ wherein $n$ is an integer ranging from 5 to about 30, said diene including a carbon chain structure selected from the group consisting of

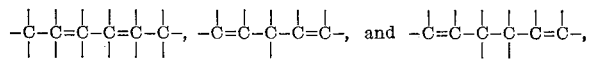

and (2) a member of the group consisting of lithium metal and a hydrocarbon lithium compound.

3. The catalyst of claim 2 wherein the non-polymerizing diene is a 2,5-dialkylhexadiene.

4. The catalyst of claim 3 wherein the 2,5-dialkylhexadiene is 2,5-dimethylhexadiene-2,4.

5. The catalyst of claim 3 wherein the 2,5-dialkylhexadiene is 2,5-dimethylhexadiene-1,5.

6. The catalyst of claim 2 wherein the hydrocarbon lithium compound is an alkyllithium compound.

7. The catalyst of claim 2 wherein the hydrocarbon lithium compound is butyl lithium.

8. The catalyst of claim 2 wherein the hydrocarbon lithium compound is ethyl lithium.

9. The catalyst of claim 2 wherein the ratio of (1) to (2) is between about 0.1 to 10 moles per equivalent.

10. In a process for the polymerization of an active conjugated diene, the improvement which comprises using a catalyst comprising (1) a non-polymerizing diene wherein the double bonds are separated by at least one carbon single bond and (2) a member of the group consisting of lithium metal and a hydrocarbon lithium compound.

11. The process of claim 10 wherein the non-polymerizing diene is a 2,5-dialkylhexadiene.

12. The process of claim 11 wherein the 2,5-dialkylhexadiene is 2,5-dimethylhexadiene-2,4.

13. The process of claim 11 wherein the 2,5-dialkylhexadiene is 2,5-dimethylhexadiene-1,5.

14. The process of claim 10 wherein the hydrocarbon lithium compound is butyl lithium.

15. The process of claim 10 wherein the hydrocarbon lithium compound is ethyl lithium.

16. The process of claim 10 wherein the ratio of (1) to (2) is between about 0.1 and 10 moles per equivalent.

17. A process for the polymerization of an active conjugated diene monomer which comprises reacting said monomer in the presence of a catalyst comprising (1) a non-polymerizing diene wherein the double bonds are separated by at least one carbon single bond and (2) a member of the group consisting of lithium metal and a hydrocarbon lithium compound.

18. The process of claim 22 wherein the hydrocarbon lithium compound is butyl lithium.

19. The process of claim 22 wherein the active conjugated diene monomer is butadiene.

20. The process of claim 22 wherein the active conjugated diene monomer is isoprene.

21. A process for the polymerization of a conjugated diene selected from the group consisting of butadiene and isoprene which comprises reacting said diene in the presence of a catalyst comprising 2,5-dimethylhexadiene-2,4 and an alkyllithium compound selected from the group consisting of butyl lithium and ethyl lithium, the ratio of the 2,5-dimethylhexadiene-2,4 to the alkyl lithium compound being in the range of about 0.1 to 10 moles per equivalent.

22. A process for the polymerization of an active conjugated diene monomer which comprises reacting said monomer in the presence of a catalyst comprising (1) a 2,5-dialkylhexadiene and (2) a member of the group consisting of lithium metal and a hydrocarbon lithium compound.

References Cited by the Examiner

UNITED STATES PATENTS

| 2,559,947 | 7/1951 | Crouch | 260—94.2 |
|---|---|---|---|
| 3,048,568 | 8/1962 | Cleary | 260—94.2 |
| 3,065,216 | 11/1962 | Greene | 260—94.2 |

FOREIGN PATENTS 776,326   6/1957   Great Britain.

JOSEPH L. SCHOFER, *Primary Examiner.*

JAMES A. SEIDLECK, *Examiner.*

H. I. CANTOR, *Assistant Examiner.*